(12) United States Patent
Wang et al.

(10) Patent No.: US 12,265,782 B2
(45) Date of Patent: *Apr. 1, 2025

(54) TRANSFORMER MODEL ARCHITECTURE FOR READABILITY

(71) Applicant: Intuit Inc., Mountain View, CA (US)

(72) Inventors: Jing Wang, Atlanta, GA (US); John Matthew Mastin, Atlanta, GA (US); Sowmyanka Andalam, Cumming, GA (US); Piyasa Molly Paul, Decatur, GA (US); Dallas Leigh Taylor, Atlanta, GA (US); Andres Castro, Atlanta, GA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,763

(22) Filed: Nov. 30, 2023

(65) Prior Publication Data

US 2024/0256759 A1 Aug. 1, 2024

Related U.S. Application Data

(63) Continuation of application No. 18/104,258, filed on Jan. 31, 2023, now Pat. No. 11,886,800.

(51) Int. Cl.
*G06F 40/151* (2020.01)
*G06F 40/166* (2020.01)
(Continued)

(52) U.S. Cl.
CPC .......... *G06F 40/151* (2020.01); *G06F 40/166* (2020.01); *G06F 40/253* (2020.01); *G06F 40/284* (2020.01)

(58) Field of Classification Search
CPC .... G06F 40/151; G06F 40/166; G06F 40/253; G06F 40/284; H04L 51/52
See application file for complete search history.

(56) References Cited

U.S. PATENT DOCUMENTS

| | | | |
|---|---|---|---|
| 11,258,734 B1* | 2/2022 | Shevchenko | G06F 40/186 |
| 2005/0267735 A1* | 12/2005 | Kharrat | G06F 40/253 |
| | | | 704/4 |

(Continued)

OTHER PUBLICATIONS

Kaychak, D., "Text Simplification Data Sets", https://os.pomona.edu/~dkauchak/simplification, accessed on Jan. 23, 2023, 1 page.

(Continued)

*Primary Examiner* — Eric Yen
(74) *Attorney, Agent, or Firm* — Lathrop GPM LLP

(57) ABSTRACT

A method including detecting, in a written electronic communication, an input sentence satisfying a readability metric threshold. The method also includes transforming, by a sentence transformer model, the input sentence to output suggested sentences. The method also includes evaluating the suggested sentences along a set of acceptability criteria. The method also includes determining, based on the evaluating, that the set of acceptability criteria is satisfied. The method also includes modifying, based on determining that the set of acceptability criteria is satisfied, the written electronic communication with the suggested sentences to obtain a modified written electronic communication. The method also includes returning the modified written electronic communication.

20 Claims, 10 Drawing Sheets

(51) Int. Cl.
*G06F 40/253* (2020.01)
*G06F 40/284* (2020.01)

(56) References Cited

U.S. PATENT DOCUMENTS

| | | | |
|---|---|---|---|
| 2013/0096909 A1* | 4/2013 | Brun | G06F 40/295 704/9 |
| 2015/0310571 A1* | 10/2015 | Brav | G06Q 10/00 705/311 |
| 2016/0103875 A1* | 4/2016 | Zupancic | G06F 40/20 707/773 |
| 2017/0193093 A1* | 7/2017 | Byron | G06F 16/3344 |
| 2017/0277781 A1* | 9/2017 | Deolalikar | G06F 16/345 |
| 2020/0142504 A1* | 5/2020 | Yu | G06F 3/0236 |
| 2020/0394361 A1* | 12/2020 | Parikh | G06F 40/274 |
| 2021/0149933 A1* | 5/2021 | Chang | G06F 16/35 |
| 2022/0030110 A1* | 1/2022 | Khafizov | H04M 3/2218 |
| 2022/0083725 A1* | 3/2022 | Pande | G06F 40/216 |
| 2022/0114340 A1* | 4/2022 | Graeser | G06N 3/045 |
| 2022/0188514 A1* | 6/2022 | Thota | G06F 40/253 |
| 2022/0293271 A1* | 9/2022 | Chang | G16H 15/00 |
| 2023/0153546 A1* | 5/2023 | Peleg | G06F 40/30 704/9 |
| 2023/0177878 A1* | 6/2023 | Sekar | G06F 40/40 382/103 |

OTHER PUBLICATIONS

Gao, T., et al., "SimCSE: Simple Contrastive Learning of Sentence Embeddings", Proceedings of the 2021 Conference on Empirical Methods in Natural Language Processing, Nov. 7-11, 2011, 17 pages.

Raffel., C., et al., "Exploring the Limits of Transfer Learning with a Unified Text-to-Text transformer", Journal of Machine Learning Research, Jan. 20, 2020, 67 pages.

* cited by examiner

TRANSFORMER MODEL ARCHITECTURE FOR READABILITY

RELATED APPLICATIONS

This application is a continuation application of U.S. application Ser. No. 18/104,258, filed Jan. 31, 2023, the entirety of which is hereby incorporated by reference.

BACKGROUND

Computers communicate using instruction based language rather than a natural language. Because computers use instructions, without being directly programmed to output a particular sentence or phrase, a challenge exists in programming a computer to output natural language text that is grammatically accurate and easy to understand.

This challenge is even more prominent in computer based correction of a human's natural language text. For computer correction, the computer is expected to perform better at producing natural language text than the human that originally created the text. Thus, in general, computer correction is performed by applying rules to sentences that define how to fix the existing sentences.

SUMMARY

In general, in one aspect, one or more embodiments relate to a method. The method includes detecting, in a written electronic communication, an input sentence satisfying a readability metric threshold. The method also includes transforming, by a sentence transformer model, the input sentence to output suggested sentences. The method also includes evaluating the suggested sentences along a set of acceptability criteria. The method also includes determining, based on the evaluating, that the set of acceptability criteria is satisfied. The method also includes modifying, based on determining that the set of acceptability criteria is satisfied, the written electronic communication with the suggested sentences to obtain a modified written electronic communication. The method also includes returning the modified written electronic communication.

One or more embodiments also provide for a system. The system includes a data repository storing a written electronic communication comprising an input sentence. The system also includes a computer processor, in communication with the data repository, for executing a sentence transformer model and an evaluation process. The sentence transformer model is configured to process the input sentence to output suggested sentences. The evaluation process is configured to detect that the input sentence satisfies a readability metric threshold. The evaluation process is also configured to evaluate the suggested sentences along a set of acceptability criteria. The evaluation process is also configured to determine, based on evaluating, that the set of acceptability criteria is satisfied. The evaluation process is also configured to modify, based on determining that the set of acceptability criteria is satisfied, the written electronic communication with the suggested sentences to obtain a modified written electronic communication. The system also includes a graphical user interface in communication with the computer processor and configured to present, responsive to the set of acceptability criteria being satisfied, the suggested sentences.

Other aspects of the invention will be apparent from the following description and the appended claims.

BRIEF DESCRIPTION OF DRAWINGS

FIG. 5A, FIG. 5B, FIG. 5C, and FIG. 5D show an example in accordance with one or more embodiments.

Like elements in the various figures are denoted by like reference numerals for consistency.

DETAILED DESCRIPTION

Figure 1:
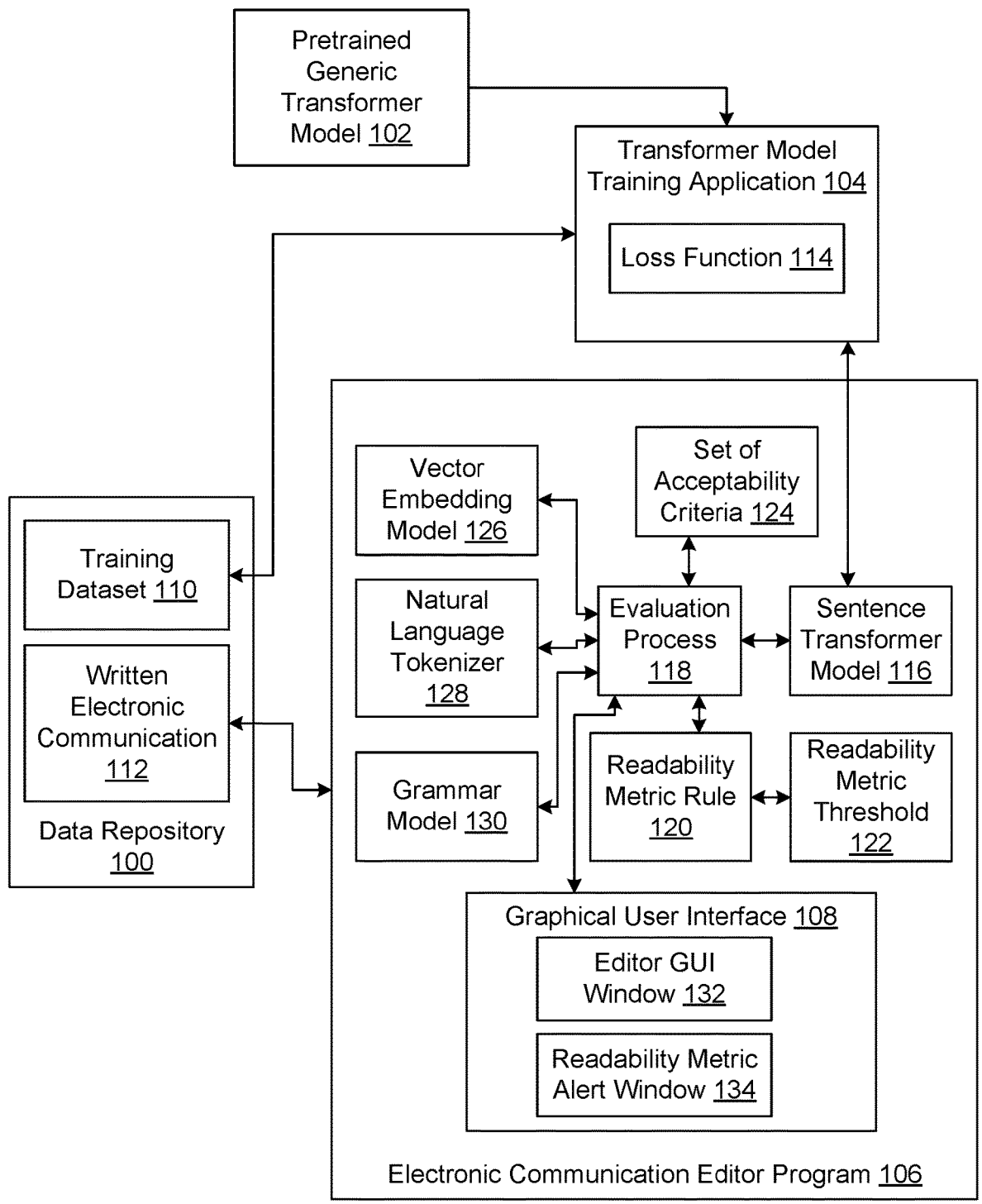
FIG. 1 shows a diagram of a system in accordance with one or more embodiments.

In general, embodiments are directed to computer correction of natural language text of a human using a two part process. In the first part, a sentence failing a readability metric rule is input to a sentence transformer model. The transformer model is a pretrained transformer model that further trained using a set of input documents and simplified version of the input documents. In the second part, the output set of sentences are analyzed against a set of acceptability criteria to determine whether to output the set of sentences.

In particular, one or more embodiments are directed to a computer generating multiple sentences from a single sentence in a written electronic communication. A written electronic communication is a communication that includes text and is transmitted electronically between a human (i.e., the user) and one or more other humans (i.e., the recipients). The computer analyzes the written electronic communication to determine whether any of the sentences in the written electronic communication has a readability metric satisfying a readability metric threshold. A readability metric is a metric that quantifies a corresponding one or more attributes of the sentence that affects readability. For example, the readability metric may be a number of complicated words, number of prepositional phrases, sentence length, etc.

If a sentence is found that is satisfies a readability metric threshold indicating that the sentence may not be easily readable, then the computer passes the sentence through a specially trained sentence transformer model. The sentence transformer model creates a suggested set of sentences that convey the same idea as the original sentence but should be in simpler natural language form. Namely, the result of the specially trained sentence transformer model is that the resulting suggested set of sentences that are easier for the recipient(s) to understand.

By using a specially trained sentence transformer model, the computer does not fix the sentence lacking readability, but rather creates a new set of sentences that have a same semantic meaning as the original sentence. Thus, one or more embodiments recognize that readability can often be improved with a rewrite rather than a grammatical update. Further, because a computer outputs the new set of sentences, the embodiments further include an evaluation process that evaluates the suggested set of sentences as compared to the input sentence to determine whether the suggested set of sentences satisfy acceptability criteria. The acceptability criteria span multiple acceptability dimensions, including similarity level between the input sentence and the suggested set of multiple sentences, grammar, and lower bias and excluded words.

From a user perspective, readability is focused on improving the user's written electronic communications by making the user's written electronic communications more capable of being skimmed by recipients. Long and challenging sentences are identified, and new suggestions are provided using embodiments described herein to improve the user's communications. If the written electronic communication is part of a marketing campaign, the campaign is more effective and easier to create. The computer identifying such content mistakes like readability can reduce the cognitive load required of users and make drafting campaigns for larger audiences less stressful.

FIG. 1 shows a diagram of a system in accordance with one or more embodiments. As shown in FIG. 1, the system includes a data repository (100), a pretrained generic transformer model (102), a transformer model training application (104), and an electronic communication editor program (106). Each of these components is described below.

In one or more embodiments of the invention, the data repository (100) is any type of storage unit and/or device (e.g., a file system, database, data structure, or any other storage mechanism) for storing data. Further, the data repository (100) may include multiple different, potentially heterogeneous, storage units and/or devices. The data repository is configured to store a written electronic communication (112) and a training dataset (110).

The written electronic communication (112) is a communication that is transmitted electronically and includes text for an end recipient to view. The written electronic communication (112) may further include one or more images, embedded media, and links as well as the text. The electronic transmission of the written electronic communication (112) may be through email, calendar invite, text message, a messaging application (e.g., short messaging service (SMS), multimedia messaging service (MMS)), social media application, or other mode of electronic transmission.

A training dataset (110) is a set of training data that is used to train the pretrained generic transformer model (102) to generate the sentence transformer model (116). In one or more embodiments, the training dataset (110) includes a set of input documents and corresponding a set of output documents. Each input document has a corresponding output document. Both the input document and the output document have the same set of information being described. The output document is a simplified natural language version of the corresponding input document. For example, the input document may have complex natural language sentences as compared to the corresponding output document. Specifically, the complex natural language input document may have longer sentences, more complex vocabulary, and more complex sentence structure as compared to the corresponding natural language output document. The input documents and the output documents may each have multiple paragraphs with multiple sentences. In one or more embodiments, the input documents and the output documents are human created. For example, input documents and the output documents may be a public set of documents that include a set of input documents and a simplified natural language version of the input documents.

The training dataset (110) is provided as input to a transformer model training application (104). A transformer model training application (104) is an application configured to train a pretrained generic transformer model (102) in order to generate a sentence transformer model (116) using a loss function (114). In one or more embodiments, the pretrained generic transformer model (102) and the sentence transformer model (116) are Text to Text Transfer Transformer (T5 transformer) models. The pretrained generic transformer model (102) is a model that has the same architecture as the sentence transformer model (116) but is only trained to produce natural language text from natural language text. The weights of the pretrained generic transformer model (102) are not designed to generate simplified natural language text from input text.

The transformer model training application (104) trains the pretrained generic transformer model (102) using the training dataset (110). Training may be performed as follows. An input document in training dataset (110) is executed by the generic transformer model (102) to create a generated document. The generated document is compared to the corresponding output document in the training dataset and a loss is calculated by the loss function (114) based on the comparison. Through backpropagation, the loss is propagated through the various layers of the sub-models of the pretrained generic transformer model (102). Through a iterative training process by repeating the above operations with the input and output documents of the training dataset (104), the pretrained generic transformer model (102) is transformed into a specific sentence transformer model (116). The specific sentence transformer model (116) is configured to generate a simplified set of sentences from input text. The specific sentence transformer model (116) is described in more detail in FIG. 2.

Continuing with FIG. 1, the system further includes an electronic communication editor program (106). The electronic communication editor program (106) is a program through which a user may create and edit the written electronic communication (112). For example, the electronic communication editor program (112) may be a program that interfaces with a user's social media, messaging, calendaring, and mail accounts to receive and transmit written electronic communication. For example, for a company, the electronic communication editor program (112) may be a program that manages the company's marketing campaigns. In such a scenario, the written electronic communication (112) is an electronic marketing communication for transmission to the company's customers (i.e., the recipients in the example).

The electronic communication editor program (106) includes an evaluation process (118). The evaluation process (118) may be a background process that continually executes as the user is creating or editing the written electronic communication or may be a triggered process that is triggered by user request or user action to move to a next stage of processing. The evaluation process (118) is configured to evaluate the written electronic communication (112) based on a set of rules and one or more dictionaries. For example, the evaluation process (118) may be configured to evaluate the text in the written electronic communication (112) using one or more dictionaries of bias words and other flag words, spelling dictionaries, and grammar rules.

The evaluation process (118) is further configured to evaluate each sentence with a readability metric rule (120). A readability metric rule (120) identifies a function to calculate a corresponding readability metric and the corresponding readability metric threshold. The readability metric rule (120) triggers a readability metric alert if a sentence of the written electronic communication (112) satisfies a readability metric threshold (122) indicating that the sentence has one or more attributes indicating a lack of readability. One example of a readability metric is sentence length. In such a scenario, the readability metric is a sentence length threshold, which is a numeric value specifying a maximum length of a sentence. For example, the sentence length threshold may be defined in terms of a number of words, a number of terms, or a number of characters from a detected start of a sentence (e.g., previous period or other such punctuation mark, capital letter, etc.) to a detected end of sentence (e.g., ending period or other punctuation mark). By way of an example, the sentence length threshold may be twenty-five words.

Other types of readability metrics with corresponding readability metric thresholds include a number of complicated words, number of prepositional phrases, number of dependent clauses, and other such metrics. Notably complicated words are words that are not customarily used by the target audience of the written electronic communication. The complicated words may be defined by a corresponding dictionary of such terms (e.g., by an allow list of acceptable words or a reject list of complicated words). As another example, a readability metric may be calculated from a combination of attributes of a sentence. For example, the readability metric may be calculated using the Flesch-Kincaid formula, the Dale-Chall formula, the Gunning fog formula, etc. Each of the corresponding readability metrics may have a corresponding readability metric threshold that defines when the sentence should be passed to the transformer model.

The readability metric alert is a notification related to the particular sentence that satisfies the readability metric threshold. From a backend perspective, the metric alert may be a document tag in the written electronic communication (112) in the data repository (100) that is related to the particular sentence satisfying the readability metric threshold.

Returning to the evaluation process (118), the evaluation process (118) is further configured to trigger the sentence transformer model (116) with an input sentence and obtain a suggested set of sentences. The evaluation process (118) is further configured to evaluate the suggested set of sentences outputted by the sentence transformer model (116) to determine whether the suggested set of sentences satisfies a set of acceptability criteria (124). The set of acceptability criteria (124) is a criteria specifying whether to accept the output as a replacement for the input sentence or whether to disregard the suggested set of sentences.

In one or more embodiments, the set of acceptability criteria (124) includes one or more of the following dimensions: that the suggested set of sentences has multiple sentences, does not include excluded words from a dictionary of excluded words (e.g., sensitive words), the suggested set of sentences has a similarity metric to the input sentence satisfying a similarity criterion, the number of bias terms in the suggested set of sentences is less than in the input sentence, and the suggested set of sentences has a greater grammar score than the input sentence. The set of acceptability criteria may be associated with a rule base that has an acceptability rule for each dimension and, potentially, a corresponding acceptability threshold.

The evaluation process (118) is configured to communicate with a vector embedding model (126), a natural language tokenizer (128), and a grammar model (130). The vector embedding model (126) is a model that is configured to generate a vector embedding from natural language text. The vector embedding is different than the embedding of the sentence transformer model. In particular, the vector embedding of the vector embedding model (126) encodes semantically similar natural language text into a same vector space and semantically dissimilar natural language text in different vector spaces. Thus, the vector embedding model (126) encodes the meaning of the input to the vector embedding model (126).

The natural language tokenizer (128) is a model that is configured to partition input into tokens based on the natural language. The output of the natural language tokenizer is identification of breakpoints of each sentence, the tokens in each sentence, etc. In one or more embodiments, the natural language tokenizer (128) is specifically configured to only use sentence punctuation as a sentence split.

The grammar model (130) is a model that takes natural language text as input and produces a grammar score based on the grammar conventions in the natural language text. In one or more embodiments, the grammar model (130) is a huggingface machine learning model that predicts the score based on the input text. The grammar model is trained based on a corpus of linguistic acceptability (CoLA) dataset. Thus, the grammar score assigns a score to an input based on the grammar of the sentence. The grammar score may be a CoLA (Corpus of Linguistic Acceptability) score.

The graphical user interface (GUI) (108) is an interface for communicating with a user. The GUI (108) include an editor GUI window (132) and a readability metric alert window (134). The editor GUI window (132) is a window for a user to create and edit the written electronic communication. The readability metric alert window (134) is configured to present an alert when the readability metric is greater than a threshold and present the suggested set of sentences when the suggested set satisfies the set of acceptability criteria (124). The GUI may be configured to automatically update the written electronic communication with the suggested set of sentences based on acceptance of a user or based on determining that the suggested set of sentences satisfies the acceptability criteria. An example of the GUI (108) is shown in FIGS. 5A-5D in one or more embodiments.

Figure 2:
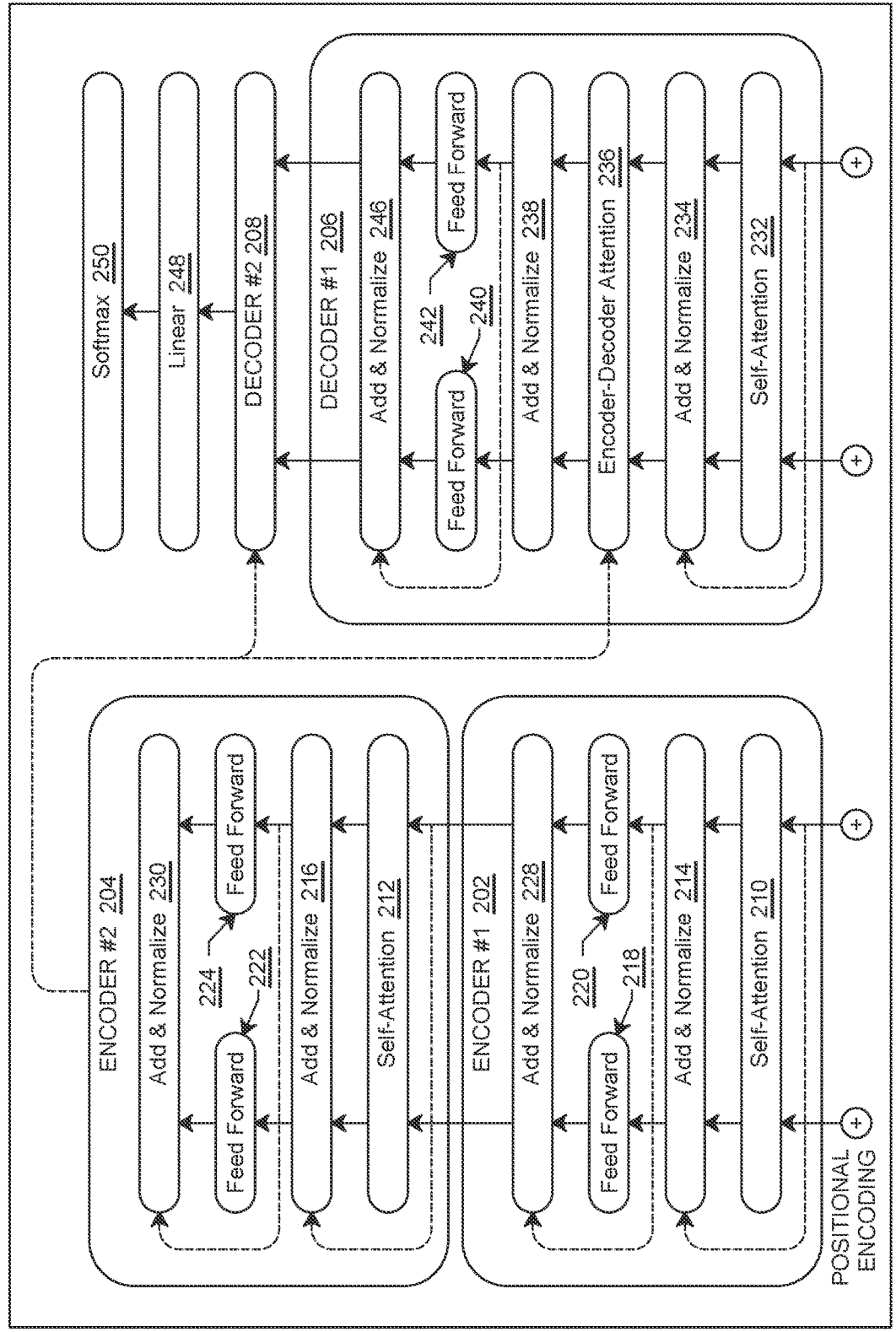
FIG. 2 is a diagram of a sentence transformer model in accordance with one or more embodiments.

FIG. 2 is a diagram of a sentence transformer model in accordance with one or more embodiments. As shown in FIG. 2, the sentence transformer model (116) may include at least two encoder models (202, 204) and at least two decoder models (206, 208). The at least two encoder models (202, 204) are encoder models that are configured to encode text input into an encoded output which is in vector space. The decoder models (206, 208) are configured to decode the encoded output to generate decoded output. Each encoder model includes an attention layer (210, 212) connected to a first add and normalize layer (214, 216). The attention layers (210, 212) are each a program implementing an attention mechanism to relate different positions of a single sequence in order to compute a representation of the same sequence. The first add and normalize layers (i.e., first normalization layer) (214, 216) are connected to feed forward neural networks (i.e., feed forward layer) (218, 220, 222, 224), which are connected to second add and normalize layers (i.e., second normalization layer) (228, 230). The input to the first encoder model (202) is the raw text version of an input sentence. The output of the first encoder model (202) is first encoded output, which is passed to the second encoder model (204). The second encoder model uses the first encoded output as input and generates second encoded output. The second encoder output is used as input to the decoder models (206, 208).

The first decoder model (206) includes a self-attention layer, add and normalize layers (234, 238, 246), an encoder-decoder attention layer (236), and feed forward neural network layers (240, 242). The decoded output of the first decoder model (206) and the second encoder output is used as input to the second decoder model, which generates second decoder output. The second decoded output is processed through a linear layer (248) and a softmax layer (250) of the sentence transformer model. The softmax layer executes a softmax function to convert a vector of numbers into a probability distribution. The output of the softmax layer (250) is a suggested set of sentences in raw text.

While FIGS. 1 and 2 show a configuration of components, other configurations may be used without departing from the scope of the invention. For example, various components may be combined to create a single component. As another example, the functionality performed by a single component may be performed by two or more components.

Figure 3:
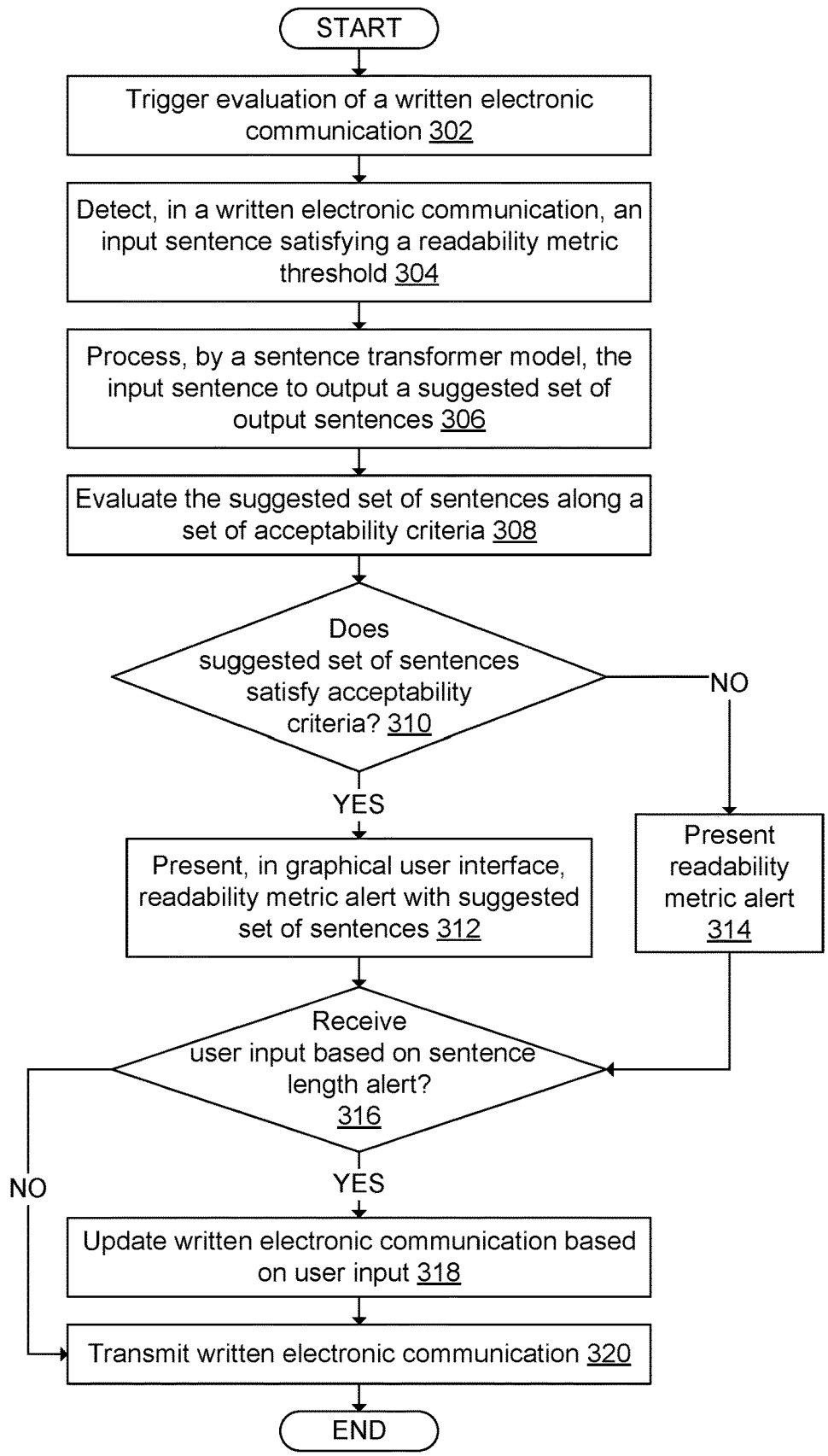
FIG. 3 is a flowchart for evaluating a written electronic communication in accordance with one or more embodiments.
Figure 4A:
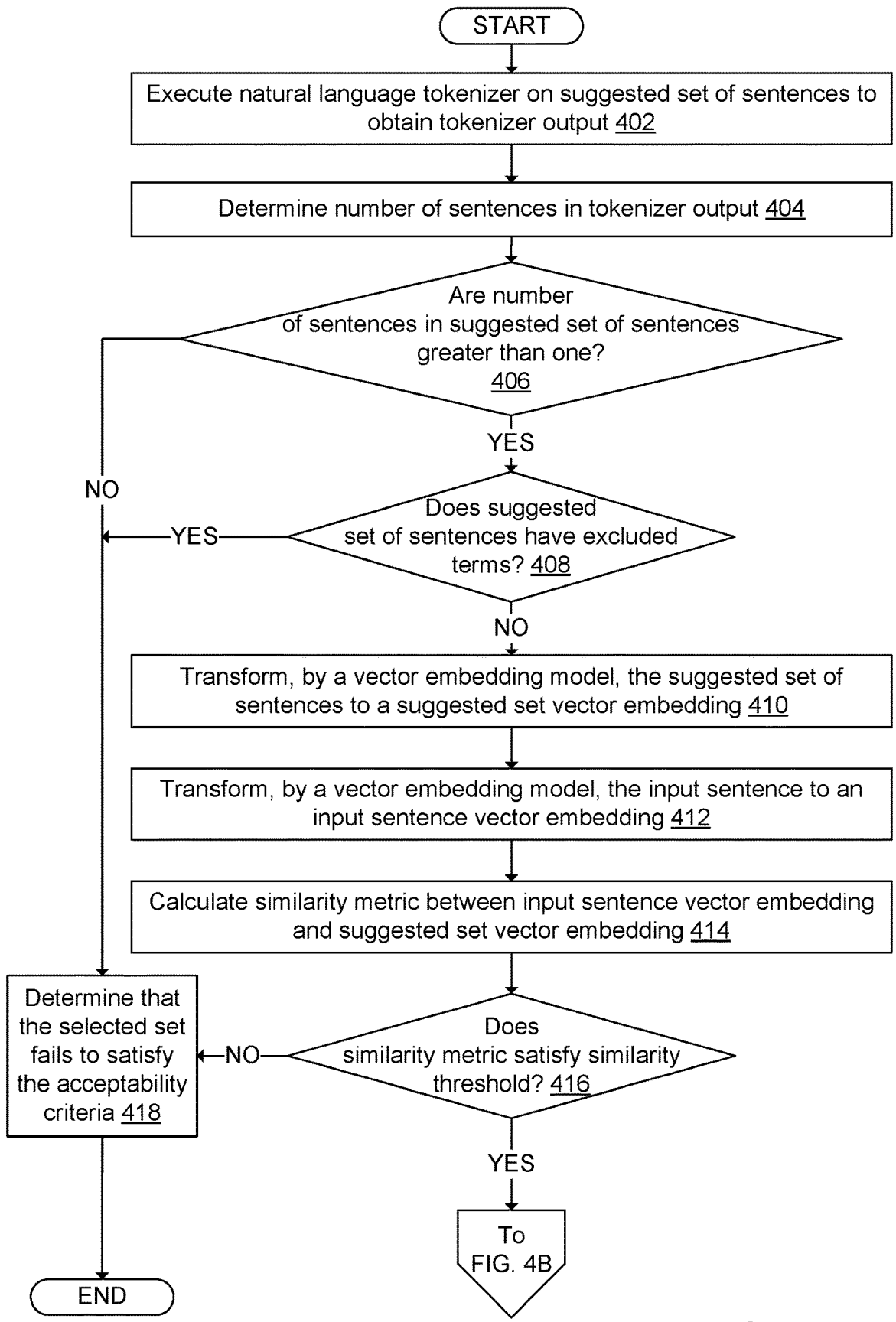
FIG. 4A and FIG. 4B shows flowcharts for evaluating a suggested set of sentences with a set of acceptability criteria in accordance with one or more embodiments.
Figure 4B:
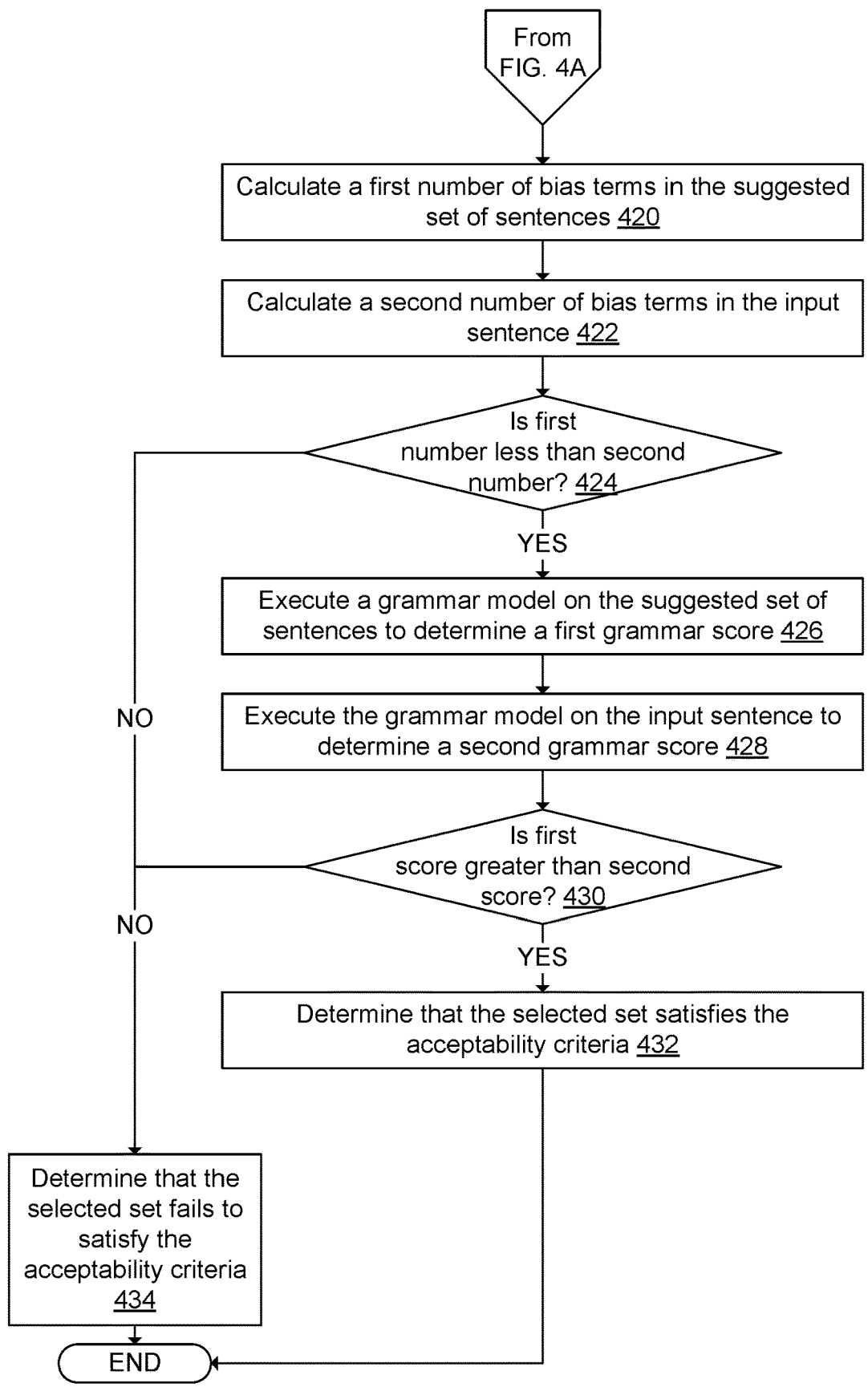

FIGS. 3, 4A, and 4B show flowcharts in accordance with one or more embodiments. While the various steps in these flowcharts are presented and described sequentially, at least some of the steps may be executed in different orders, may be combined or omitted, and at least some of the steps may be executed in parallel. Furthermore, the steps may be performed actively or passively.

FIG. 3 is a flowchart for evaluating a written electronic communication in accordance with one or more embodiments. In Block 302, evaluation of a written electronic communication is triggered. For example, while the user is submitting edits or new inputs to the written electronic communication in the editor GUI window, the evaluation process may execute as a background process and evaluate the written electronic communication based on a set of rules. As another option, the evaluation process may be triggered by the user, such as by selecting an evaluation button in the GUI or by selecting to move on to the next stage of an editing process.

In Block 304, an input sentence in the written electronic communication is detected as being greater than the readability metric threshold. The term, "input" in input sentence refers to the sentence being in the written electronic communication, such as by being input by the user, prior to the evaluation of FIG. 3. "Input" is used to distinguish between the suggested set of sentences that is the output of the processing of FIG. 3. As part of the evaluation, the evaluation process triggers a natural language tokenizer on the text in the written electronic communication. The natural language tokenizer returns with the breakpoints between sentences based on sentence punctuation and the number of words in each sentence.

The readability metric rule identifies how to calculate a readability metric and compare the readability metric to the corresponding readability metric threshold. The readability metric is a metric that quantifies the quality of the how readable the sentence is. In some cases, the readability metric may be a direct calculation, such as number of words in the sentence, number of prepositional phrases, number of clauses, etc. In other cases, the readability metric is a function of multiple attributes. By way of an example of the readability metric being sentence length, the number of words is compared to the sentence length threshold. Sentences greater than the sentence length threshold or, more generally, having a readability metric exceeding the corresponding readability metric threshold are tagged for further analysis.

In some embodiments, only text that is part of a paragraph is evaluated for readability metric. Text that is part of title, headers, subject lines, links, buttons in the electronic communication are omitted from the evaluation. In such embodiments, only sentences in paragraphs may be evaluated against the readability metric rule and, correspondingly, the readability metric threshold. Input sentence(s) that fail to satisfy the readability metric threshold may be tagged in the written electronic communication, such as by using a document tag that is stored in the written electronic communication. For example, the document tag may be a Hypertext Markup Language (HTML) tag associated with the input sentence if the written electronic communication is HTML format. Other types of document tags or markings may be used to flag the input sentence in the data repository.

In Block 306, a sentence transformer model processes the input sentence to output the suggested set of sentences. The sentence transformer model performs the operations of FIG. 2 to process the input sentence. The sequence of tokens, in order, of the input sentence are passed as raw text to the sentence transformer model. The sentence transformer model encodes the input sentence through the first encoder model obtain a first encoded output. The first encoded output is further encoded through a second encoder model obtain a second encoded output. A first and second decoder model decode the second encoded output to obtain decoded output, which is then processed by the linear layer and the softmax layer. Through the processing, the sentence transformer model generates the suggested sequence of sentences as natural language text.

In Block 308, the suggested set of sentences are evaluated along a set of acceptability criteria. The suggested set of sentences may be evaluated to determine whether the suggested set of sentences has multiple sentences, does not include excluded words from a dictionary of excluded words (e.g., sensitive words), is semantically similar (i.e., conveys a similar meaning) as the input sentence, and is better than the input sentence from the dimensions of bias and grammar. A technique for performing the evaluation is described in FIGS. 4A and 4B.

In Block 310, a determination is made whether the suggested set of sentences satisfies the acceptability criteria. In some embodiments, failure to satisfy any of the set of acceptance criteria may result in the suggested set being rejected. In other embodiments, weights may be applied to the acceptance criteria in the set such that failure to satisfy an acceptance criterion may be allowed if the remaining acceptance criteria is satisfied.

If the suggested set of sentences satisfies the acceptability criteria, the readability metric alert is presented in the GUI with the suggested set of sentences in Block 312. For example, the GUI may show a readability metric alert, such as by underlining, highlighting, flagging, or otherwise marking the input sentence as being detected as defective for a particular reason (i.e., greater than the readability metric threshold). The readability metric alert may include an explanation of the marking. Selection of the marking or with the marking, the suggested set of sentences are presented. An example of presenting the suggested set of sentences is described in FIGS. 5A-5D.

Returning to Block 310, if the suggested set of sentences does not satisfy the acceptability criteria, the readability metric alert is presented without the suggested set of sentences in Block 314. The readability metric alert may be presented as described in Block 312.

In Block 316, a determination is made whether user input is received based on the readability metric alert. For example, the user may select the suggested set of sentences, or the user may start editing the input sentence in the written electronic communication.

If user input is received, then the written electronic communication is updated based on the user input in Block 318. For example, when the GUI detects the selection of the suggested set of sentences, the GUI automatically replaces the input sentence with the suggested set of sentences. The selection may be through the user selecting an accept button or a replace button on the suggested set of sentences. Other GUI widgets may be used for the user to indicate acceptance. As another example, the user may start editing the input sentence in the GUI, such as in the editor GUI window. In such a scenario, upon detecting that the user is editing the input sentence directly, the GUI may remove the readability metric alert. The updated written electronic communication may be stored automatically in the data repository or stored after receiving the user selection to store the update.

Returning to Block 316, the user may optionally ignore the readability metric alert. In such a scenario, the written electronic communication is not updated based on the set of input sentences.

Regardless of whether the written electronic communication is updated, in Block 320, the written electronic communication is transmitted to recipients. For example, through the editing process, the GUI may continue to guide the user through editing and updating the written electronic communication. At the time that the written electronic communication is approved to send, the computer transmits the written electronic communication on a network via the network interface. For example, the written electronic communication may be transmitted via email client, SMS, MMS, social media application, or other mode of communication to the designated recipients. By performing one or more embodiments described herein, the recipients view an easier-to-read communication.

FIG. 4A and FIG. 4B shows flowcharts for evaluating a suggested set of sentences with a set of acceptability criteria in accordance with one or more embodiments. In Block 402, a natural language tokenizer is executed on the suggested set of sentences to obtain tokenizer output. The natural language tokenizer is a sentence tokenizer. As such, the natural language tokenizer identifies sentence endings based on a list of abbreviations and returns a list of individual sentences as tokenizer output. A pre-trained natural language tokenizer may be further trained to recognize more abbreviations (e.g., Dr./Mr.) by adding the additional abbreviations to the abbreviation lists. The natural language tokenizer outputs the breakpoints between sentences and the tokens of the sentences.

In Block 404, the number of sentences in a tokenizer output is determined. In one or more embodiments, the evaluation process identifies the breakpoints between the sentences directly from the tokenizer output. Using the breakpoints, the evaluation process counts the number of sentences.

In Block 404, determination is made whether the number of sentences in the suggested set of sentences is greater than one. If the number of sentences is not greater than one, the flow may proceed to Block 418. In Block 418, a determination is made that the suggested set of sentences does not satisfy the acceptability criteria and the system continues as described above in FIG. 3.

If the suggested set of sentences is determined to be greater than one in Block 406, then a determination is made whether the suggested set of sentences include any excluded terms in Block 408. Determining whether the suggested set of sentences include excluded terms may be performed by comparing the terms in the suggested set of sentences to a dictionary of excluded terms. Excluded terms may be terms that are deemed offensive or satisfy other criteria for not being acceptable in a written electronic communication. If the suggested set of sentences has excluded terms, the flow may proceed to Block 418 where the determination is made that the suggested set of sentences fails to satisfy acceptability criteria.

If the suggested set of sentences does not have excluded terms, the flow may proceed to Block 410. In Block 410, the suggested set of sentences is transformed to a suggested set vector embedding. In Block 412, the input sentence is transformed to a input sentence vector embedding. To transform the suggested set of sentences and the input sentence to respective vector embeddings in Block 410 and 412, the evaluation process may use a vector embedding model. The vector embedding model is a machine learning model that is trained to encode the natural language text based on semantic meaning. For example, SIMCSE vector embedding model may be used. As another example, universal-sentence-encoder model may be used to generate the vector embedding.

In Block 414, a similarity metric between the input sentence vector embedding and the suggested set vector embedding is calculated. For example, the similarity metric may be calculated as a cosine similarity may be between the respective vector embeddings. The inner product of the vector embeddings may be calculated as the similarity metric. As another example, the angular distance may be used as the similarity metric. Angular distance is calculated by first computing the cosine similarity of the two sentence embeddings and then use Arccosine function (Arccos) to convert the cosine similarity into an angular distance. The angular distance calculated using Arccos is the similarity metric.

In Block 416, a determination is made whether the similarity metric satisfies the similarity threshold. The similarity metric is compared with a similarity threshold to determine whether the similarity threshold is satisfied. For example, if the similarity threshold is 0.9, then if the similarity is above a 0.9 similarity, then the suggested set of sentences is above similarity and passes. If below the similarity threshold, then the suggested set of sentences does not pass. If the similarity metric does not satisfy the similarity threshold, the flow may proceed to Block 418 where a determination is made that the selected set of sentences fails to satisfy the acceptability criteria.

If the similarity metric satisfies the acceptability threshold, the flow may proceed to FIG. 4B. Turning to FIG. 4B, in Block 420, a number of bias terms in the suggested set of sentences is calculated. In Block 422, a number of bias terms in the input sentence is calculated. Bias may be determined by counting bias terms in the respective sentences. Bias terms are terms that are deemed to exhibit bias. For example, bias terms may be terms that show gender bias, such as pronouns (e.g., "he", "she", "him", "her", "his", "hers", "himself", "herself", etc.) In the example, the first number and the second number may be determined by counting a pronouns in the sentences. In Block 424, a determination is made whether the first number is less than the second number. If the first number is less than the second number, the suggested set of sentences has fewer bias terms. Thus, the flow may proceed to Block 426. If the first number is greater than the second number, the flow may proceed to Block 434, where a determination is made that the selected set of sentences fail to satisfy the acceptability criteria. Block 434 may be performed similar to Block 418.

In Block 426, a grammar model is executed on the suggested set of sentences to determine a first grammar score. In Block 428, a grammar model is executed on the input sentence to determine a second grammar score. The evaluation process sends the input sentence and the suggested set of sentences to the grammar model that identifies grammatical errors and deviations from a grammar norm (e.g., order of prepositional phrases), etc. In Block 430, a determination is made whether the first grammar score is greater than the second grammar score. If the first grammar score is less than the second grammar score, then the suggested set of sentences are determined to be grammatically worse than the input sentence. In such a scenario, the flow proceeds to Block 434 and a determination is made that the selected set of input sentences fails to satisfy the acceptability criteria. If the first score is greater than the second score, then the flow proceeds to Block 432 and a determination is made that the selected set of sentences satisfies the acceptability criteria. The flow returns to FIG. 3 as described above.

Although FIGS. 4A and 4B describe a particular set of acceptability criteria and a particular order, some of the acceptability criteria may be excluded from being checked and acceptability criteria not described may be included. Further, the evaluation may be in virtually any order. For example, the operations of Blocks 420-424 may be before the operations of Blocks 410-416.

In some cases, the time order of evaluating the set of acceptability criteria on the suggested set of sentences may be determined based on amount of processing resources to perform the evaluation. For example, because the natural language tokenizer outputs the sentence tokens that are used in various acceptability rules as well as the number of sentences, the natural language tokenizer may be executed first. Because a direct comparison may be performed on the output of the natural language tokenizer to determine that the number of sentences is greater than one, the first evaluation may be the number of sentences. Other orderings and acceptability criteria not described may be included herein without departing from the scope of the invention.

Figure 5A:
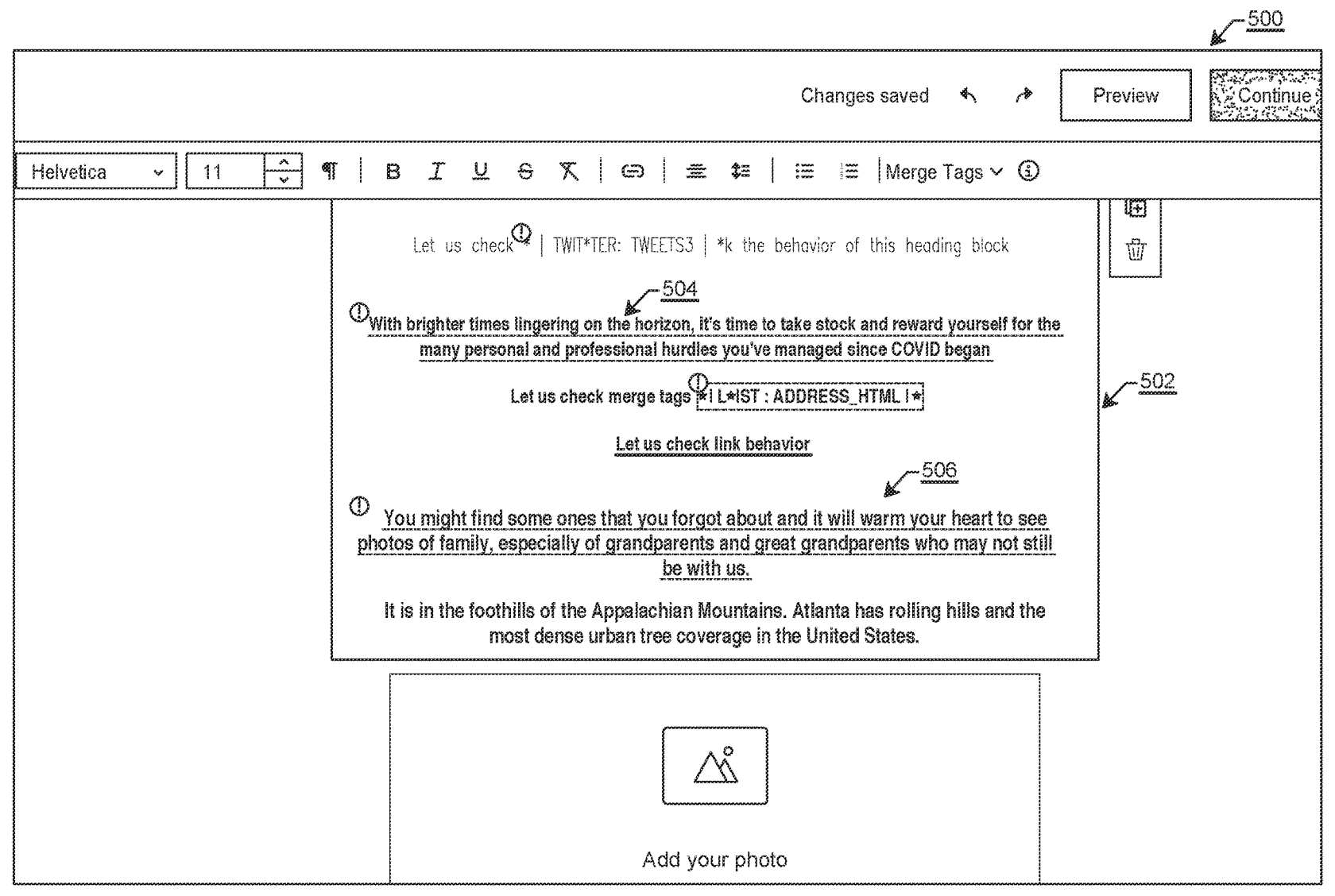
Figure 5B:
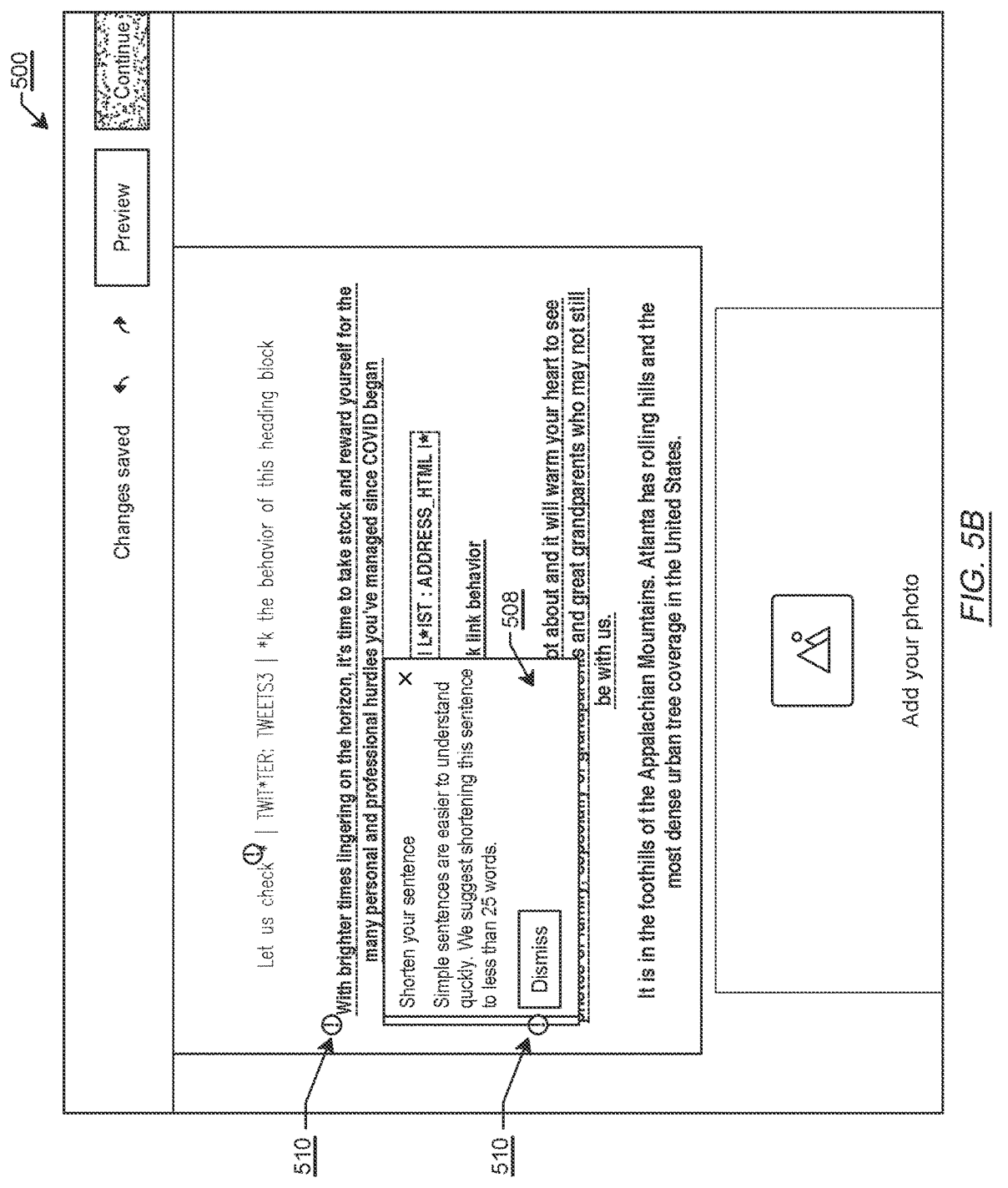
Figure 5C:
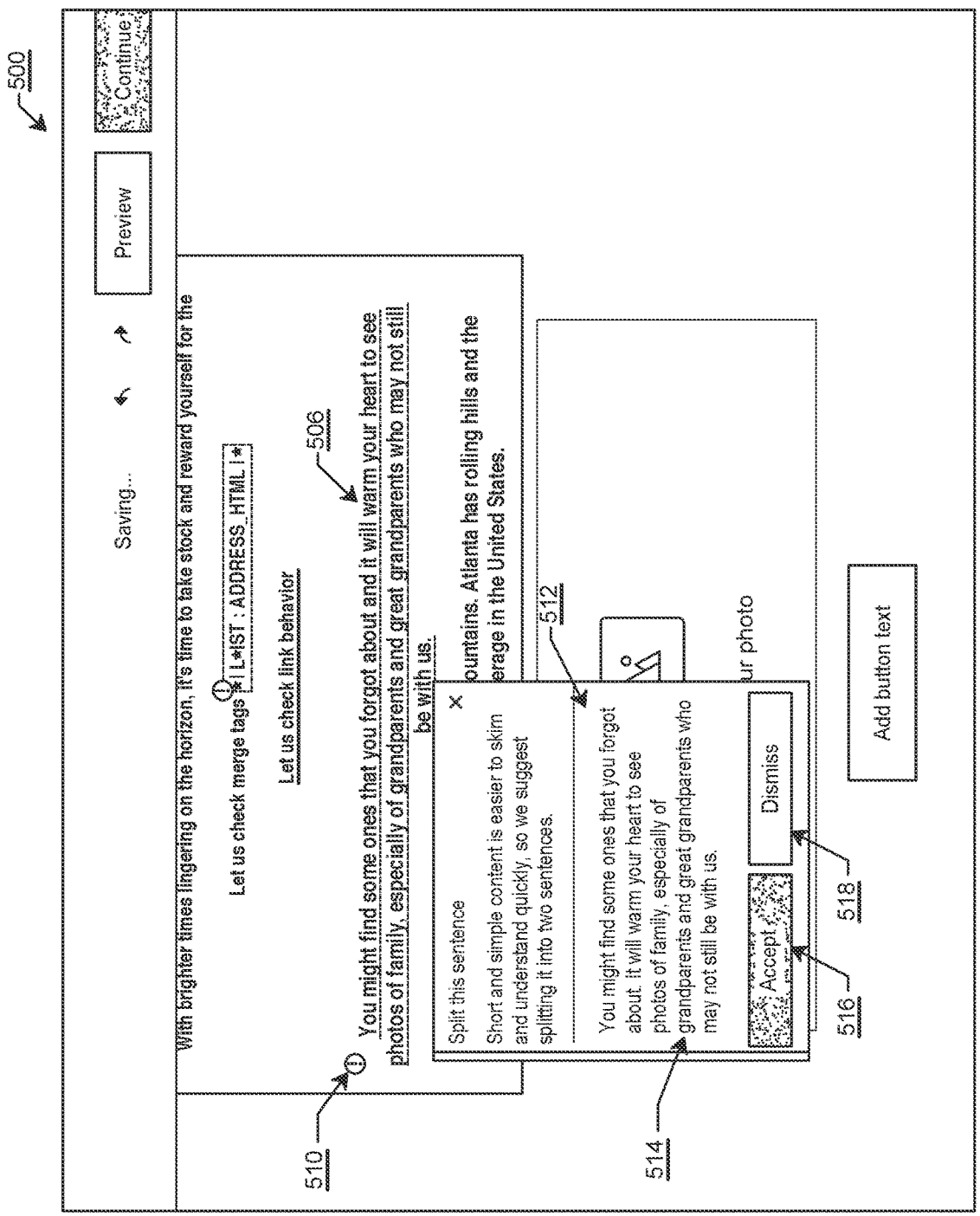

FIG. 5A, FIG. 5B, FIG. 5C, and FIG. 5D show an example in accordance with one or more embodiments. In the example, the readability metric is sentence length. FIG. 5A shows an example GUI (500) with the editor GUI window (502) that is used to edit and provide suggestions for a written electronic communication after analysis is performed. The written electronic communication in the example is an email. As shown in FIG. 5A, two sentences are marked. The first sentence (504) is "With brighter times lingering on the horizon, it's time to take stock and reward yourself for the many personal and professional hurdles you've managed since COVID began." The second sentence (506) is "You might find some ones that you forgot about and it will warm your heart to see photos of family, especially of grandparents and great grandparents who may not still be with us."

FIG. 5B show the example GUI (500) with an example of the sentence length alert window (508) when a user hovers over the sentence, the acceptability criteria is not satisfied, or the user selects the exclamation button next to the sentence. The sentence length transformer model is triggered when the user's input sentence length is above the readability metric threshold for sentence length. In the example, the sentence length threshold is set to 25 words. Thus, if the user's sentence is greater than 25 words then the sentence length transformer model is triggered to create a new set of sentences for the selected sentence. The sentence length alert window explains to the user that the sentence is too long. If the user starts editing a sentence, the alert for the sentence is removed. The sentence may be reevaluated after editing. Selecting the exclamation button (510) next to the sentence provides more details about the alert.

FIG. 5C shows the example GUI (500) with an example of the suggestion window (512) when the user selects the exclamation button (510) adjacent to the second sentence (506). As shown, the second sentence (506) is changed from "You might find some ones that you forgot about and it will warm your heart to see photos of family, especially of grandparents and great grandparents who may not still be with us." to a suggested set of multiple sentences (514). The multiple sentences (514) are "You might find some ones that you forgot about. It will warm your heart to see photos of family, especially of grandparents and great grandparents who may not still be with us." The user may select the accept button (516) or the dismiss button (518) to accept or reject the change. If the GUI detects accept button (516) is selected, then the GUI replaces the second sentence (506) with the suggested set of multiple sentences (514) in the written electronic communication as shown in FIG. 5D.

Figure 5D:
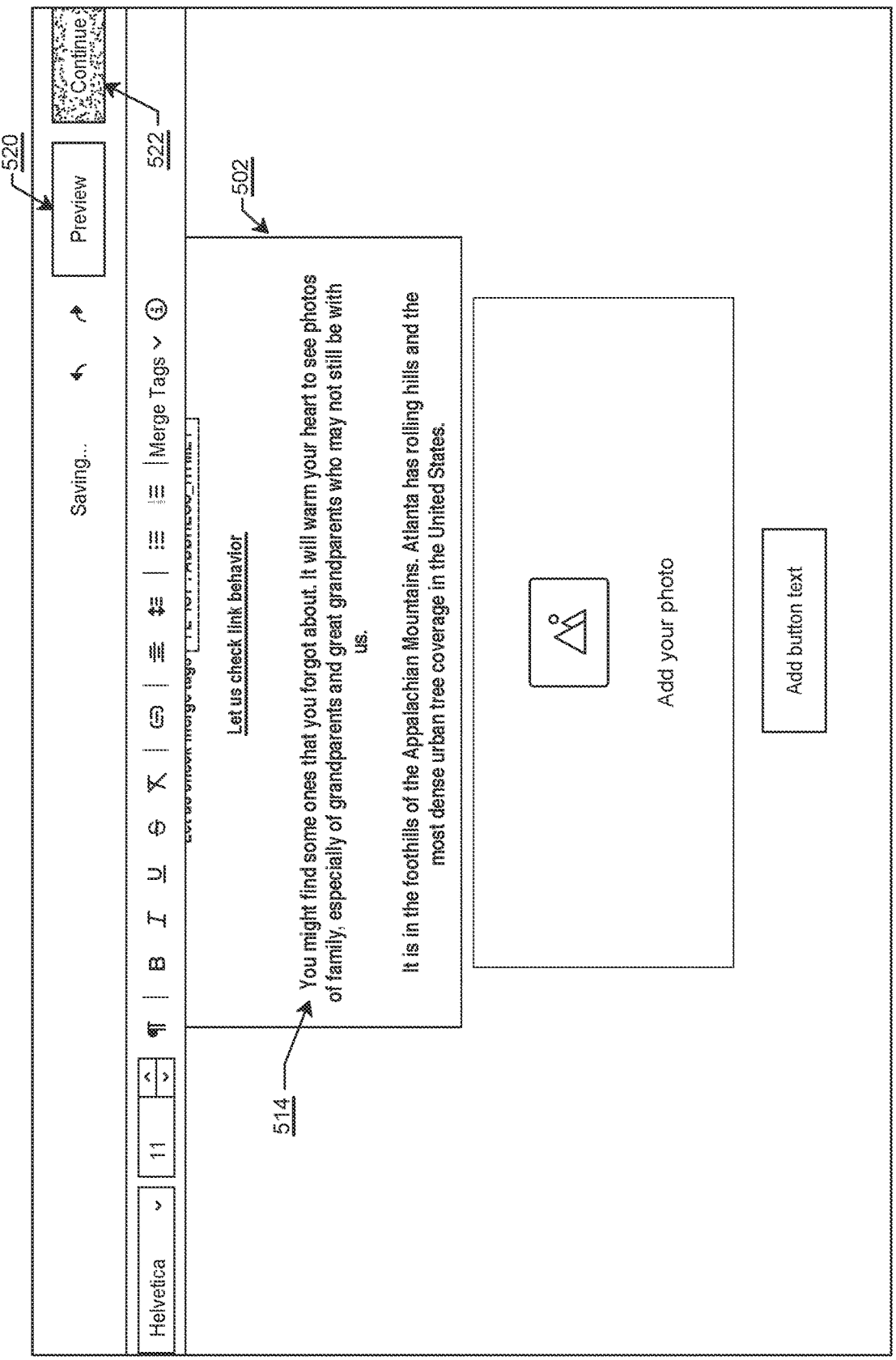

Specifically, FIG. 5D show GUI (500) with the editor GUI window (502) to further edit the written electronic communication after the second sentence is replaced. The user may further add images, buttons, and button text. Upon detecting a user selection of the preview button (520), the GUI shows a preview the written electronic communication as it would be presented to the recipients. Upon detecting a selection of the continue button (522), the modified written electronic communication is saved and/or may be transmitted to the recipients.

Figure 6A:
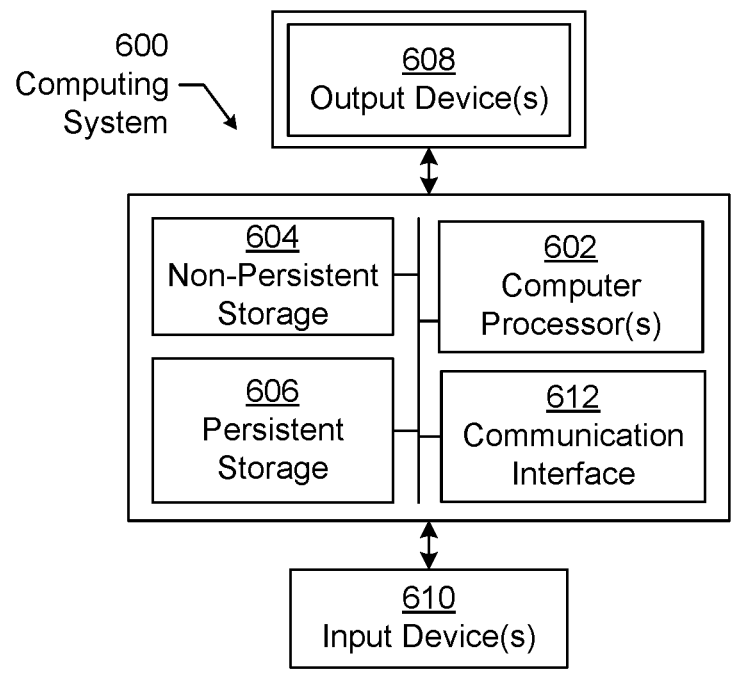
FIG. 6A and FIG. 6B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing units (TPU), combinations thereof, etc.

The input devices (610) may include a touchscreen, keyboard, mouse, microphone, touchpad, electronic pen, or any other type of input device. The input devices (610) may receive inputs from a user that are responsive to data and messages presented by the output devices (612). The inputs may include text input, audio input, video input, etc., which may be processed and transmitted by the computing system (600) in accordance with the disclosure. The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (612) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms. The output devices (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 6B:
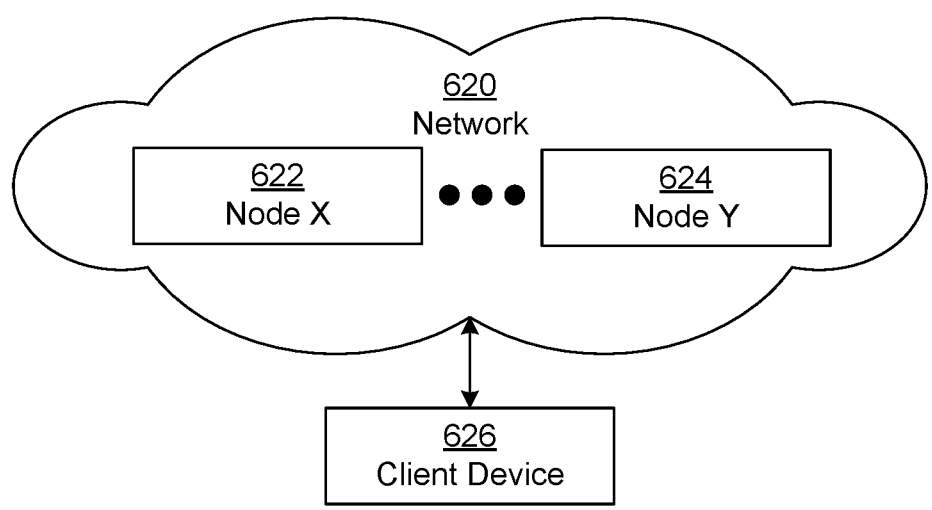

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    detecting, in a written electronic communication, a first input sentence satisfying a readability metric threshold;
    transforming, by a sentence transformer model, the first input sentence to output a plurality of suggested sentences;
    evaluating the plurality of suggested sentences along a set of acceptability criteria;
    determining, based on the evaluating, that the set of acceptability criteria is satisfied;
    modifying, based on determining that the set of acceptability criteria is satisfied, the written electronic communication with the plurality of suggested sentences to obtain a modified written electronic communication; and
    returning the modified written electronic communication.

2. The method of claim 1, wherein each of the plurality of suggested sentences contain fewer words that the first input sentence.

3. The method of claim 1, further comprising:
    displaying on a display device, responsive to determining that the set of acceptability criteria is satisfied, an alert window indicating that the first input sentence may be shortened.

4. The method of claim 3, further comprising:
    displaying a widget in the alert window, wherein the widget is configured to be selected by a user to accept the modified written electronic communication, wherein modifying of the written electronic communication is performed responsive to selection of the widget by the user.

5. The method of claim 1, wherein the plurality of suggested sentences together have a new semantic meaning similar to the written electronic communication.

6. The method of claim 1, wherein, as part of modifying the written electronic communication, the method further comprises:
excluding a set of excluded words from the modified written electronic communication.

7. The method of claim 1, wherein evaluating comprises:
transforming, by a vector embedding model, the plurality of suggested sentences to a suggested set vector embedding;
transforming, by the vector embedding model, the first input sentence to an input sentence vector embedding; and
calculating a similarity metric between the suggested set vector embedding and the input sentence vector embedding,
wherein determining that the acceptability criteria is satisfied is based at least in part on the similarity metric satisfying a similarity threshold.

8. The method of claim 1, wherein evaluating comprises:
executing a natural language tokenizer on the plurality of suggested sentences to obtain tokenizer output; and
determining a number of sentences in the tokenizer output,
wherein determining that the acceptability criteria is satisfied is based at least in part on the number of sentences being greater than one.

9. The method of claim 1, wherein evaluating comprises:
calculating a first number of bias terms in the plurality of suggested sentences; and
calculating a second number of bias terms in the first input sentence,
wherein determining that the acceptability criteria is satisfied is based at least in part on the first number being less than the second number.

10. The method of claim 1, wherein evaluating comprises:
executing a grammar model on the plurality of suggested sentences to obtain a first grammar score; and
executing the grammar model on the first input sentence to obtain a second grammar score,
wherein determining that the acceptability criteria is satisfied is based at least in part on the first grammar score being greater than the second grammar score.

11. The method of claim 1, further comprising:
detecting, in the written electronic communication, a second input sentence satisfying the readability metric threshold;
processing, by the sentence transformer model responsive to the second input sentence satisfying the readability metric threshold, the second input sentence to output a second suggested set of sentences;
evaluating the second suggested set of sentences along the set of acceptability criteria; and
determining that the second suggested set of sentences fails to satisfy the set of acceptability criteria; and
presenting a readability metric alert window advising of the second input sentence satisfying the readability metric threshold, the readability metric alert window presented without the second suggested set of sentences.

12. The method of claim 1, further comprising:
presenting a readability metric alert window advising of the first input sentence satisfying the readability metric threshold, the readability metric alert window comprising the plurality of suggested sentences.

13. A system comprising:
a data repository storing a written electronic communication comprising an input sentence; and
a computer processor, in communication with the data repository, for executing:
a sentence transformer model configured to:
process the input sentence to output a plurality of suggested sentences,
an evaluation process configured to:
detect that the input sentence satisfies a readability metric threshold, evaluate the plurality of suggested sentences along a set of acceptability criteria,
determine, based on evaluating, that the set of acceptability criteria is satisfied, and
modifying, based on determining that the set of acceptability criteria is satisfied, the written electronic communication with the plurality of suggested sentences to obtain a modified written electronic communication; and
a graphical user interface in communication with the computer processor and configured to:
present, responsive to the set of acceptability criteria being satisfied, the plurality of suggested sentences.

14. The system of claim 13, further comprising:
a network connection configured to transmit the modified written electronic communication to a recipient.

15. The system of claim 13, wherein each of the plurality of suggested sentences contain fewer words that the input sentence.

16. The system of claim 13, further comprising:
a display device,
wherein the computer processor is further programmed, responsive to determining that the set of acceptability criteria is satisfied, to display on the display device an alert window indicating that the input sentence may be shortened.

17. The system of claim 16, wherein the computer processor is further programmed to display a widget in the alert window, wherein:
the widget is configured to be selected by a user to accept the modified written electronic communication; and
modifying of the written electronic communication is performed responsive to selection of the widget by the user.

18. The system of claim 13, wherein the plurality of suggested sentences together have a new semantic meaning similar to the written electronic communication.

19. The system of claim 13, wherein, as part of modifying the written electronic communication, the evaluation process is further configured to exclude a set of excluded words from the modified written electronic communication.

20. The system of claim 13, further comprising:
wherein the computer processor is further programmed to edit, in a window of the graphical user interface, the written electronic communication.

* * * * *